Patented Jan. 15, 1946

2,392,859

UNITED STATES PATENT OFFICE 2,392,859

HERBICIDES

Lloyd J. Meuli, Midland, Mich., assignor to The Dow Chemical Company, Midland, Mich., a corporation of Michigan No Drawing. Application April 10, 1944, Serial No. 530,397

13 Claims. (Cl. 167—45)

This invention relates to herbicides and is particularly directed to a novel herbicidal composition and to a method for the selective control of noxious vegetation.

Among the organic and inorganic materials which have been suggested for use as herbicides and for retarding or otherwise regulating plant growth are the inorganic chlorates, arsenic compounds, sulfuric acid, dinitro-ortho-cresol and its sodium salt, ammonium sulfamate, and petroleum oil. All of these products may be used in certain phases of vegetation control, but none has been found entirely satisfactory.

The chlorates are disadvantageous by reason of their highly flammable nature, whereby residues on the clothing of an operator constitute a serious hazard, and the destruction by burning of the dried chlorate-impregnated plant residues is frequently a dangerous operation. Also, these compounds are very corrosive to metal containers and applicators, whereby special equipment is required for their handling. The use of arsenic-containing compounds is limited because of the dangers accompanying the possibility of the ingestion of arsenic by either animals or humans. Petroleum oil not only is highly flammable, but also leaves objectionable sticky residues on the dead vegetation. Also, deposits of the foregoing materials in and on the soil may interfere with its subsequent utilization for long periods of time.

Ammonium sulfamate is relatively less toxic to animals, but it has been found that residues of this material on dried plant structures serve to fireproof the latter, whereby the disposal by burning of weed tops and the like is not practical. Also, this material is effective only in relatively high concentrations thus making its use unattractive from an economic viewpoint.

A particular disadvantage accruing to the use of the conventional herbicidal materials is found in their specificity, whereby certain noxious plants may be controlled, but others are substantially unaffected. Also, the kill obtained is frequently superficial in that the tops or a portion of the tops only may be browned and burned and the development of secondary growth actually accelerated, whereby such problems as roadside weed control are met only by frequent application of the herbicide.

It is among the objects of the present invention to provide an improved herbicide composition. It is a further object to provide a composition which will not be subject to many of the disadvantages accruing to existing herbicide materials as set forth above. A further object is to provide a selective herbicide composition and a method for the selective control of broad leaf weeds in stands of field crops such as flax, grain, etc. Other objects will become apparent from the following description.

I have discovered that plants can be killed by contacting their leaves and stalks with 2.4-dinitro-6-secondarybutyl-phenol or one of its water-soluble salts in combination with a carrier. The proper and timely application of such herbicidal mixture results in the browning and dying off of the treated plant and the control of many of the insect and fungus organisms present on the plant or in the soil adjacent thereto and which may be contacted with the composition.

Many advantages accrue to the use of compositions containing 2.4-dinitro-6-secondarybutyl-phenol and its salts which do not characterize known herbicidal materials. Thus, sprays and dusts containing these phenolic toxicants are adapted to kill any and all vegetation under proper conditions of treatment. This includes such plants as nettles, bindweed, yellow star thistle, Russian knapweed and the like, for which adequate control measures have previously not been known. Also, the new compositions are relatively non-irritating to the skin of humans and, in the amounts employed, non-toxic to animals. This, coupled with the fact that they do not corrode metal surfaces or rot or injure rubber fittings or tires of spraying or dusting equipment, renders the new compositions much to be preferred over the chlorates, petroleum oil, or sulfuric acid, as previously used.

Further advantages include the relatively complete control obtainable with a single treatment against many forms of plant growth. This obviates the necessity for repeated application as is the case where the herbicide gives but a superficial burning of the leaves and stalks followed by an accelerated development of secondary growth. Also residues of the new compositions on the dried plant surfaces and in the soil are not objectionable. Thus, the removal of the dead plant structures from roadsides, fields, and ditch banks may be conveniently accomplished by burning within a few days after treatment without the danger attendant to burning chlorate-impregnated refuse. Also, the small amounts of the phenol toxicant deposited in and on the soil do not impair the usefulness of the soil for agricultural purposes.

The new compositions show a greatly increased toxicity as compared with previously used nitrophenolic herbicides, and the amounts of chemical required to accomplish a given result are so materially smaller than have previously been found necessary that the saving from an economic standpoint is of great practical importance. The selectivity of the new compositions is such that when properly applied a substantial margin of safety is provided between the amounts required to control broad leaf weeds and those tolerated by field crops such as flax, grain, onions, and the like.

A particular embodiment of the invention comprises the application of the new compositions for the killing of potato vines. The destruction of the leaves and stalks of the potato late in the growing season stops the tuber growth when it has been determined that a preferred average-sized tuber has been developed. This is of great advantage in the production of premium table stock and certified seed since it prevents secondary growth as evidenced by knobby formations on the tubers and also controls to a great degree the formation of hollow-centered and oversized tubers. Other advantages accruing to such practice are that the killing of the vines prevents the transmission of late blight from the vines to the tubers, whereby rotting in storage is largely avoided. Also, if the vines are killed, clogging of mechanical diggers by the heavy stalk and leaf growth is avoided. A further advantage is that the treatment of the potatoes accomplishes an incidental kill of weeds and grass.

Other typical applications for which the compositions of the present invention are adapted include the eradication of plant growth from roadsides, drainage ditch banks, irrigation ditches, fallow land, and the soil surfaces in and about orchards and groves where cultivation is either undesirable or impractical. A preferred embodiment of the invention is the applications of the compositions as selective herbicides for the control of broad leaf weeds in field crops.

In operating in accordance with the present invention, the 2.4-dinitro-6-secondarybutyl-phenol or its water-soluble salt is compounded with carriers to form either spray or dust compositions. In the preparation of spray mixtures for non-selective herbicide application, from about 0.01 to about 1.0 per cent by weight or more of the phenolic toxicant is dispersed in water or other suitable liquid carrier. The exact proportions of toxicant employed are dependent upon the nature of the plants to be controlled, the presence or absence in the composition of other additaments such as wetting agents, petroleum oil, and the like, and the amount of the finished spray to be applied per acre. Generally from about 100 gallons to about 800 gallons of the spray is applied per acre. Instead of a simple water solution or dispersion, oil alone, or an aqueous oil emulsion may be employed as a carrier. Where such practice is followed, relatively small amounts of the phenolic toxicant are required. Also, the use of wetting agents and dispersing agents in the compositions greatly increase the effectiveness of a given amount of toxicant.

In the preparation of spray mixtures for selective control of weeds in growing crops, from about 0.25 pound to 1.5 pounds of the phenolic toxicant is employed per 100 gallons of water and the use of wetting agents is carefully avoided. Such spray is ordinarily applied at from 75 to 200 gallons per acre. The exact proportions of toxicant in the selective herbicide spray composition and the amount of such spray applied vary considerably with the nature of the crop to be treated. Thus, with flax from about 0.25 to 0.75 pound per 100 gallons of water is generally preferred with application at the rate of 100 gallons per acre. For grains such as barley and wheat, as much as 1.5 pounds per 100 gallons is satisfactory.

In compounding the spray compositions, the toxicant may simply be dissolved in water or oil. An alternate method of procedure comprises dissolving the toxicant in a small amount of a water-miscible organic solvent and adding such concentrate to the required amount of water. Similarly, the toxicant may be dissolved or dispersed directly into existing oil emulsions. Another way in which spray compositions may be prepared is by the addition to water, oil emulsion, oil, or other liquid carrier, of herbicide concentrates consisting of the phenolic toxicant in mixture with suitable wetting agent or dispersed on a finely-divided solid carrier.

In the preparation of dust mixtures, the phenolic toxicant is generally employed in somewhat higher concentration. Thus, 2.4-dinitro-6-secondarybutyl-phenol or its water-soluble salt may be compounded with any suitable finely-divided carrier in the amount of from 1 per cent to 10 per cent by weight or higher. This may be accomplished by grinding the toxicant and carrier together. An alternate procedure comprises wetting the carrier with a solution of the effective ingredient in volatile organic solvent and thereafter evaporating off the solvent.

The method of application of the new compositions to plant growth for the purpose of accomplishing a non-selective control is not critical, provided only that contact be made with the plant surfaces at least a short time prior to heavy precipitation. Thus, sprays or dusts may be applied to plant surfaces wet with either dew or rain and under any conditions of temperature. Optimum results are obtained by the use of low pressure spray equipment, but any apparatus adapted to give coverage and contact of the plant surfaces is suitable.

Application of the compounds for selective herbicide control is somewhat more critical. Thus, the plant surfaces should not be wet at the time of application if injury to the crop is to be avoided. Either spraying or dusting for selective control is best carried out through the middle of the day. For sprays, the treatment is conveniently accomplished with any suitable type of equipment adapted to deliver a fine spray of the composition onto the surfaces of the weeds to be controlled. A preferred method of operation consists of applying the spray through a boom attached to a mobile spray outfit, the boom connecting directly to the spray tank and being equipped with downwardly directed nozzles distributed at intervals along its length. Such equipment permits the treatment of a considerable swath of grain or other field crop in a single pass whereby mechanical injury to the crop from the truck, tractor, or similar spray vehicle is minimized.

In the foregoing paragraphs, reference has been made to a number of additaments and carriers for use with 2.4-dinitro-6-secondarybutyl-phenol and its water-soluble salts. Depending upon the use for which the ultimate composition is designed, a wide variety of liquid and/or solid carriers are suitable. Water, oil, oil emulsions and the like have been suggested for the preparation of spray mixtures. Suitable oils include those of petroleum, animal, vegetable or synthetic origin, e. g. Diesel oil, lubricating oil, soybean oil, linseed oil, castor oil, sperm oil, cod-liver oil, liquid olefins, etc. Among the solid carriers which may be employed in combination with the phenolic toxicants are pyrophyllite, talc, volcanic ash, diatomaceous earth, wood flour, bentonite, lime, and the like. Suitable wetting agents, emulsifiers, and dispersing agents for use in the present compositions include sodium lauryl sulfate, blood albumin, glyceryl oleate, soaps, sulfonated aromatic compounds, sulfonated oils, metal caseinates, sulfite pulping waste products, complex organic ester derivatives, salts of sulfonated phenols, aromatic aliphatic ether alcohols, and the like. Also, various activators may be employed in the composition such as ammonium sulfate, aluminum sulfate, etc.

Representative of the plants against which the compositions as herein described have been found effective are nettles, wild oats, Bermuda grass, knapweed, yellow star thistle, burr clover, cattails, malva, wild tobacco, dock, pigweed, chickweed, wild radish, mustard, wild lettuce, sassafras, wild cherry, night shade, bindweed, poison ivy, wild morning-glory, fiddle-neck, alfilaria, salt-water vegetation, lambs' quarters, purslane, etc.

The following examples illustrate the invention but are not to be construed as limiting:

EXAMPLE 1

A spray composition was prepared by dissolving 1.5 pounds of ammonium 2.4-dinitro-6-secondarybutyl-phenolate and 1.5 pounds of sodium lauryl sulfate in 100 gallons of water. This composition was sprayed at the rate of 200 gallons per acre upon a mixed stand of chickweed and pigweed. 100 per cent kill of these weeds was obtained within 72 hours.

EXAMPLE 2

3 pounds of ammonium 2.4-dinitro-6-secondarybutyl-phenolate and 1.5 pounds of sodium lauryl sulfate were dispersed in 100 gallons of water, and the resulting spray mixture applied at the rate of 400 gallons per acre to a mixed stand of wild oats and weeds. Within 72 hours there had been obtained a kill of 100 per cent on nettles, malva, chickweed, wild morning-glory, and wild radish, and a kill of 80 per cent on wild oats.

EXAMPLE 3

The ammonium salt of 2.4-dinitro-6-secondarybutyl-phenol was employed at the rate of 0.33 pound per 100 gallons of water as a selective herbicide on a mixed stand of young flax, wild radish, and fiddle-neck. No wetting agent was included in this composition. The application was made at the rate of approximately 200 gallons per acre and the spraying was carried out during the middle of the day and after the dew had completely evaporated from the plant surfaces. As a result of this treatment there was obtained in 3 days a 100 per cent kill of radish and fiddle-neck. The flax did not appear to be injured in any way.

EXAMPLE 4

The triethanolamine and sodium salts of 2.4-dinitro-6-secondarybutyl-phenol were also employed substantially as described in the preceding example. In these operations, it was found that all concentrations ranging between 0.25 and 0.5 could be applied to mixed stands of flax, wild radish, and fiddle-neck to obtain 100 per cent control of the weed growth without injury to the flax.

EXAMPLE 5

In controlled operations upon small plantings of various weeds, the ammonium, triethanolamine, and sodium salts of 2.4-dinitro-6-secondarybutyl-phenol were applied without wetting agent and dissolved in water to determine their comparative efficiency. The rate of application was 150 to 175 gallons per acre. In the following table, the concentrations are expressed in terms of the amounts of free 2.4-dinitro-6-secondarybutyl-phenol present in the phenolate solutions.

Table

| Plants | Ammonium 2.4-dinitro-6-secondary butyl-phenolate | | Sodium 2.4-dinitro-6-secondarybutyl-phenolate | | Triethanolamine 2.4-dinitro-6-secondarybutyl-phenolate | |
|---|---|---|---|---|---|---|
| | 0.2 lb. per 100 gals. | 0.4 lb. per 100 gals. | 0.2 lb. per 100 gals. | 0.4 lb. per 100 gals. | 0.2 lb. per 100 gals. | 0.4 lb. per 100 gals. |
| Wild mustard | 100 | 100 | 90 | 100 | 90 | 100 |
| Wild radish | 100 | 100 | 90 | 100 | 90 | 100 |
| Nettle | | 100 | | | | |
| Clover | | 100 | | 75 | | 75 |
| Alfilaria | | 100 | | | | 100 |

Similar determinations in which ammonium 2.4-dinitro-6-secondarybutyl-phenolate at 0.4 pound per 100 gallons was modified with various wetting agents gave 100 per cent control and kill of wild mustard, wild radish, malva, nettle, wild morning-glory, burr clover and alfilaria. When these mixtures were applied to wild oats and mixed grasses, 100 per cent of the tops were destroyed. The wetting agents employed were sodium lauryl sulfate at 0.168 per cent and two commercial mixtures marketed as B-1956 R. and H, and Vatsol both at 0.1 per cent.

EXAMPLE 6

Several acres of young flax infested with mature plants of wild radish and mustard were sprayed with a solution of 0.5 pound of ammonium 2.4-dinitro-6-secondarybutyl-phenolate in water at the rate of 100 gallons per acre. The apparatus employed consisted of a truck mounting a low pressure spray tank equipped with a 40-foot boom upon which nozzles were distributed at an average of 30-inch intervals in such fashion as to direct the spray down and upon the flax and weed growth. Examination of the field at regular intervals following application showed substantially 100 per cent control of the mustard and radish with no injury to the flax.

EXAMPLE 7

Irrigation ditch banks covered with a rank growth of wild oats, Bermuda grass, malva, fiddle-neck, etc., were sprayed with a 3 per cent aqueous oil emulsion containing 2.0 pounds of the ammonium salt of 2.4-dinitro-6-secondary-butyl-phenol per 100 gallons. The amount of spray material employed was just sufficient to wet all vegetation. A 100 per cent kill of tops was obtained within a period of 3 days. Six weeks after application, inspection of the sprayed banks showed that the plants were apparently killed, since no sprouts or new growth were in evidence. Removal of the dead and dried vegetation was conveniently accomplished by burning.

EXAMPLE 8

Roadsides and drainage ditches heavily grown over with Bermuda grass, wild oats, plantain, cattails, and salt-water vegetation were sprayed with an aqueous solution containing 4 pounds ammonium 2.4-dinitro-6-secondarybutyl-phenolate and 1 pound of sodium lauryl sulfate per 100 gallons. The apparatus employed was a low-pressure hand rig. A heavy rain fell 4 hours after application and the treated plants were intermittently showered by rain for a period of 24 hours. At the end of this time all vegetation was found to be wilted. Inspection after 72 hours showed all broad leaf vegetation to be dead. 5 days after application, the grasses, salt-water vegetation, and miscellaneous weeds were browned and dry and burned readily. 7 days after application the cattails were apparently dead and undergoing bacterial decomposition.

EXAMPLE 9

An herbicide concentrate was prepared by dissolving 22.7 parts by weight of 2.4-dinitro-6-secondarybutyl-phenol and 17.3 parts of triethanolamine in 60 parts of water. This product was employed in the preparation of dilute aqueous sprays for the killing of potato vines prior to harvest. It was found that 2 gallons of the concentrate mixture diluted with 100 gallons of water and sprayed on mature potato vines at the rate of 125 gallons per acre gave 100 per cent kill of vines with no secondary growth or new sprouts developing over a period of 3 weeks. This treatment was carried out at a time when a high percentage of the potato tubers were of an average size and form suitable for use as certified seed and table stock. Upon harvest it was found that the potatoes were well formed and regular in size. These potatoes were stored and examined from time to time. A substantial absence of rot attributable to the presence of blight organisms was observed.

Potatoes from untreated fields in which the development of the plant was not arrested by the killing-off of the vines were found to include a high percentage of tubers of irregular shape and form, many of which were oversized and hollow-centered. Upon storage, considerable rotting was observed attributable to the presence of potato blight communicated through the vines to the tubers and at time of harvest by contact of the tubers with the succulent vine growth.

EXAMPLE 10

20 parts by weight of 2.4-dinitro-6-secondarybutyl-phenol and 80 parts of diatomaceous earth were ground and mixed together. 5.0 pounds of the mixture was dispersed in 100 gallons of water containing 0.5 pound of sodium lauryl sulfate. The resulting spray was applied to beans. This treatment was found to give 100 per cent control of bean mildew and to kill 100 per cent of the bean foliage.

EXAMPLE 11

A similar determination was carried out in which 1.0 pound of triethanolamine 2.4-dinitro-6-secondarybutyl-phenolate was dissolved in 100 gallons of water and the resulting spray applied to mildew infested mature plants of cranberry bean. The treatment gave 100 per cent kill of all foliage contacted therewith.

EXAMPLE 12

0.5 pound of finely-divided 2.4-dinitro-6-secondarybutyl-phenol and 0.25 pound of sodium lauryl sulfate were mixed with sufficient water to give 100 gallons of spray material. This mixture was applied with a conventional mechanical spray rig to potato foliage, whereby there was obtained 100 per cent control of Colorado potato beetle and a complete kill of the potato foliage.

EXAMPLE 13

Mixed stands of broad leaf weeds including mustard, wild radish, malva, yellow star thistle, etc., and young barley and wheat, are treated with 100 gallons per acre of an aqueous solution containing between 1.0 and 1.25 pounds of ammonium 2.4-dinitro-6-secondarybutyl-phenolate per 100 gallons. Within one week of application, the weeds are substantially completely destroyed without visible injury to the grain.

EXAMPLE 14

8 parts by weight of 2.4-dinitro-6-secondarybutyl-phenol was dissolved in 50 parts of toluene and this solution used to wet 92 parts by weight of finely-divided pyrophyllite. The resulting mixture was dried to recover the solvent and to give a finely-divided dust product in which the phenol was distributed in and through the particles of pyrophyllite. This material was applied with field dusting apparatus to growing potatoes at a time when the majority of the tubers were of optimum size to qualify as certified seed. Within a few days after application, the vines were brown and dry. Although the potatoes were allowed to remain in the ground for some time, upon digging they were found to be of relatively uniform size and form and to be free from blight organisms. In contrast, potatoes from check plots were irregular in size and form and, when harvested, were found to be contaminated with blight apparently caused by contact with the vines during the digging operation.

EXAMPLE 15

1 part by weight of 2.4-dinitro-6-secondarybutyl-phenol was dissolved in 10 parts of acetone and this solution used to wet 99 parts of pyrophyllite. The resulting product was dried, ground, and dusted lightly over the surfaces of bean plants. All of the treated plants were killed.

EXAMPLE 16

Other herbicidal compositions may be prepared in which 2.4-dinitro-6-secondarybutyl-phenol and its water-soluble salts are employed as active toxicants. The following are representative:

Composition A

| | Parts by weight |
|---|---|
| 2.4-dinitro-6-secondarybutyl-phenol | 0.01 |
| Heavy petroleum oil | 4.0 |
| Sodium lauryl sulfate | 0.99 |
| Water | 95.0 |

*Composition B*

Potassium 2.4 - dinitro - 6 - secondarybutyl-
  phenolate _____pounds__  6
Vatsol (a commercial wetting agent)
                              pounds__  1
Water_____ 100

*Composition C*

Monoethanolamine 2.4-dinitro-6-second-
  arybutyl-phenolate _____pounds__  0.5
Water _____gallons__ 100.0

*Composition D*

Dipropanolamine 2.4 - dinitro-6-secondary-
  butyl-phenolate_____pounds__  1
Water_____gallons__ 100

Of the foregoing, Compositions A and B are adapted for use as non-selective herbicide sprays for the control of roadside weeds and the like. Compositions C and D have value as selective weed-killers in the treatment of onions, wheat, rye, etc.

I claim:

1. An herbicidal composition including as an active ingredient a member of the class consisting of 2.4-dinitro-6-secondarybutyl-phenol and its water-soluble salts, and a carrier therefor.

2. An herbicidal spray including as an active ingredient a member of the class consisting of 2.4-dinitro-6-secondarybutyl-phenol and its water-soluble salts, and a liquid carrier therefor.

3. An herbicidal spray including as an active ingredient a member of the class consisting of 2.4-dinitro-6-secondarybutyl-phenol and its water-soluble salts, a wetting agent and a liquid carrier for the toxicant and wetting agent.

4. An herbicidal spray composition including as an active ingredient at least 0.01 per cent by weight of a member of the class consisting of 2.4-dinitro-6-secondarybutyl-phenol and its water-soluble salts, and a liquid carrier therefor.

5. A selective herbicidal spray composition substantially free of wetting agents and including as an active ingredient between about 0.25 and 1.5 pounds of a member of the class consisting of 2.4-dinitro-6-secondarybutyl-phenol and its water-soluble salts per 100 gallons.

6. A selective herbicidal spray composition substantially free of wetting agents and including as an active ingredient between about 0.25 and 1.5 pounds of the triethanolamine salt of 2.4-dinitro-6-secondarybutyl-phenol per 100 gallons.

7. A selective herbicidal spray composition substantially free of wetting agents and including as an active ingredient between about 0.25 and 1.5 pounds of 2.4-dinitro-6-secondarybutyl-phenol per 100 gallons.

8. An herbicidal spray including as an active ingredient a member of the class consisting of 2.4-dinitro-6-secondarybutyl-phenol and its water-soluble salts, an oil, a wetting and dispersing agent, and water.

9. An herbicidal spray including as an active ingredient 2.4-dinitro-6-secondarybutyl-phenol, and a liquid carrier therefor.

10. An herbicidal spray including as an active ingredient the ammonium salt of 2.4-dinitro-6-secondarybutyl-phenol, and a liquid carrier therefor.

11. An herbicidal spray including as an active ingredient the triethanolamine salt of 2.4-dinitro-6-secondarybutyl-phenol, and a liquid carrier therefor.

12. The method which comprises spraying a mixed stand of broad-leaf weeds and narrow-leaf field crop at a time when the plant surfaces are free of dew and rain with an aqueous solution of a member of the class consisting of 2.4-dinitro-6-secondarybutyl-phenol and its water-soluble salts in the amount of from 0.25 to 1.5 pounds per 100 gallons, such spray being substantially free of wetting agents, to accomplish the selective control of the weed growth.

13. A selective herbicidal spray composition substantially free of wetting agents and including as an active ingredient between about 0.25 and 1.5 pounds of the ammonium salt of 2.4-dinitro-6-secondarybutyl-phenol per 100 gallons.

LLOYD J. MEULI.